US010525731B2

(12) United States Patent
LeFevre et al.

(10) Patent No.: US 10,525,731 B2
(45) Date of Patent: *Jan. 7, 2020

(54) IMAGE AWARE LASER DIODE ARRAY SHUTTER FOR REDUCED INCIDENT ENERGY ON DMD CHIP SET

(71) Applicant: Xerox Corporation, Norwalk, CT (US)

(72) Inventors: Jason M. LeFevre, Penfield, NY (US); Paul J. McConville, Webster, NY (US); Douglas K. Herrmann, Webster, NY (US); Steven R. Moore, Pittsford, NY (US)

(73) Assignee: Xerox Coporation, Norwalk, CT (US)

( * ) Notice: Subject to any disclaimer, the term of this patent is extended or adjusted under 35 U.S.C. 154(b) by 534 days.

This patent is subject to a terminal disclaimer.

(21) Appl. No.: 15/259,486

(22) Filed: Sep. 8, 2016

(65) Prior Publication Data

US 2018/0067300 A1 Mar. 8, 2018

(51) Int. Cl.
| | |
|---|---|
| *B41J 2/455* | (2006.01) |
| *B41J 2/447* | (2006.01) |
| *G02B 26/02* | (2006.01) |
| *G02B 26/08* | (2006.01) |
| *G02F 1/01* | (2006.01) |
| *B41M 5/26* | (2006.01) |
| *B41J 2/475* | (2006.01) |

(52) U.S. Cl.
CPC ............... *B41J 2/455* (2013.01); *B41J 2/447* (2013.01); *G02B 26/0833* (2013.01); *G02F 1/0147* (2013.01); *B41J 2/4753* (2013.01); *B41M 5/26* (2013.01)

(58) Field of Classification Search
CPC ... G02B 26/02; G02B 26/0833; G02F 1/0147; B41M 5/26; B41J 2/455; B41J 2/4753

USPC ....... 359/227–263; 235/1 A, 462.13, 462.36, 235/98 A, 98 C

See application file for complete search history.

(56) References Cited

U.S. PATENT DOCUMENTS

| | | | | |
|---|---|---|---|---|
| 4,383,195 | A * | 5/1983 | Kolm ..................... | H01H 57/00 200/181 |
| 5,061,049 | A | 10/1991 | Hornbeck | |
| 5,384,662 | A * | 1/1995 | Andresen ................. | G01J 3/04 359/227 |

(Continued)

FOREIGN PATENT DOCUMENTS

GB        2379746      *   3/2003   ............ G02B 26/02

OTHER PUBLICATIONS

Nayar, S. K. et al., Programmable Imaging Using a Digital Micromirror Array, IEEE Conference on Computer Vision and Pattern Recognition (2004) vol. I, pp. 436-443.

(Continued)

*Primary Examiner* — George G King
(74) *Attorney, Agent, or Firm* — Kermit D. Lopez; Luis M. Ortiz; Ortiz & Lopez, PLLC (57) ABSTRACT

A laser imaging system and method. In an example embodiment, one or more laser diode arrays are associated with a digital micro-mirror device. A shutter-like device can be positioned upstream in the light path of the laser diode array (or arrays) such that the shutter-like device diverts energy out of the laser imaging system and away from the digital micro-mirror device during periods of extended non-imaging. A homogenizer module can be provided wherein the shutter-like device is located.

20 Claims, 7 Drawing Sheets

(56) References Cited

U.S. PATENT DOCUMENTS

| | | | |
|---|---|---|---|
| 6,493,364 B1* | 12/2002 | Baumler | H01S 3/03 372/107 |
| 7,184,201 B2 | 2/2007 | Duncan | |
| 7,542,199 B1 | 6/2009 | Mayer et al. | |
| 7,864,825 B2 | 1/2011 | Thiagarajan et al. | |
| 8,432,597 B2 | 4/2013 | Knipe | |
| 8,960,917 B2 | 2/2015 | Tseng | |
| 9,093,812 B2 | 7/2015 | Ryudo et al. | |
| 9,310,697 B2 | 4/2016 | Yun et al. | |
| 10,054,857 B2* | 8/2018 | Herrmann | G03F 7/702 |
| 10,067,362 B2* | 9/2018 | Herrmann | G02F 1/0121 |
| 2004/0207290 A1* | 10/2004 | Okada | H02N 2/0025 310/317 |
| 2005/0084766 A1* | 4/2005 | Sandstrom | G03F 7/70283 430/5 |
| 2006/0227514 A1 | 10/2006 | Kang et al. | |
| 2006/0268387 A1 | 11/2006 | Lianza | |
| 2007/0126997 A1 | 6/2007 | Kang | |
| 2008/0285120 A1 | 11/2008 | Lo et al. | |
| 2010/0067076 A1* | 3/2010 | Brotherton-Ratcliffe | G03H 1/202 359/12 |
| 2010/0110024 A1 | 5/2010 | Kim et al. | |
| 2013/0107222 A1 | 5/2013 | Hsu et al. | |
| 2013/0314671 A1 | 11/2013 | Tseng | |
| 2014/0300881 A1 | 10/2014 | Kim et al. | |
| 2015/0160454 A1 | 6/2015 | Bhakta | |
| 2015/0377446 A1 | 12/2015 | Bhakta | |
| 2018/0038784 A1* | 2/2018 | Marks | G01N 15/1425 |

OTHER PUBLICATIONS

Deboer, C., Digital Light Processing (DLP) Television & Projection, Audioholics, Online A/V Magazine, Aug. 30, 2004, 5 pages.

Lee, B., DMD 101: Introduction to Digital Micromirror Device (DMD) Technology, Texas Instrument Application Report, Revised Oct. 2013. 11 pages.

Horsley, S. D., Digital Micromirror Device (DMD), From R&D to a Profitable Business, DLP, A Texas Instruments Technology, 24 pages, 2003, http://web.mit.edu/nanosymposium/www/Presentations/Horsley.pdf.

Thermochromism—Wikipedia, the free encyclopedia, printed Aug. 11, 2016, 5 pages.

* cited by examiner

IMAGE AWARE LASER DIODE ARRAY SHUTTER FOR REDUCED INCIDENT ENERGY ON DMD CHIP SET

TECHNICAL FIELD

Embodiments are generally related to the field of laser imaging. Embodiments also relate to thermochromic ink printing and digital laser imaging. Embodiments further relate to laser diode arrays and DMD (Digital Micro-Mirror Device) technologies.

BACKGROUND

High-intensity line-source lasers can be utilized to deliver energy selectively to clear thermochromic inks. Thermochromic inks or dyes are temperature sensitive compounds that can temporarily (or in this case permanently) change color with exposure to heat. Such thermochromic inks can, for example, change from clear to black at a given energy level. Digitally selective heating of the inks with, for example, a LIM (Laser Imaging Module) can deliver a digital image on a surface pre-coated with the thermochromatic inks.

The digitally selective switching of the laser power in the LIM can be enabled using a DMD (Digital Micro-mirror Device), which resides in the enclosure also containing the laser source (e.g., Laser Diode Array). DMD's are commercially available components, which were originally designed to operate with lower incident energy levels. The current level of incident energy, however, exceeds the device's ability to adequately dissipate heat from the DMD chip. If the DMD chip (and its internal components) exceed a critical temperature (70° C.), they can become damaged. Currently, a DMD can only run at about 80% power for a duration of approximately 20 seconds before attaining a maximum temperature. The desire is to have the ability to operate the device at 100% power @ 100% duty-cycle. However, a laser source such as a laser diode array uses a large amount of power and cannot be power-cycled at high rates of speed.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved laser imaging device, system, and method.

It is another aspect of the disclosed embodiments to provide for an improved laser imaging device, system, and method that incorporates a digital micro-mirror device and a shutter-like device that diverts energy out of the laser imaging system and away from the digital mirror device.

The aforementioned aspects and other objectives and advantages can now be achieved as described herein. Laser imaging devices, systems, and methods are disclosed. In an example embodiment, a laser diode array (or a group of such arrays) is associated with a digital micro-mirror device. A shutter-like device can be positioned upstream in the light path of the laser diode array (or arrays) such that the shutter-like device diverts energy out of the laser imaging system and away from the digital micro-mirror device during periods of extended non-imaging. A homogenizer module can be provided within which the shutter-like device is located.

Thus, in an example embodiment, a slotted shutter-like device (or "shutter") can be located upstream from a thermally sensitive DMD chip, selectively blocking any input laser energy and dissipating that incident energy. The shutter-like device is "blocking" when there are extended periods of time in which the laser is not needed (i.e., there are no pixels of variable data active) to deliver power to the substrate. The shutter-device is configured with the capability to absorb the incident light, when necessary, and dissipate it to a location away from the temperature sensitive components of the laser imaging system. Feed-forward image content information is available to a shutter-actuator, so that it operates with a minimum amount of laser energy incident on the DMD chip.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein do not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms, such as "and," "or," or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

High-intensity line-source lasers can be utilized to delivery energy selectively to clear thermochromic inks. Such thermochromic inks can change from clear to black at a given energy level. Digitally selective heating of the inks with a LIM (Laser Imaging Module) delivers a digital image on a surface pre-coated with the thermo-chromatic inks. In the disclosed embodiments, laser energy is incident (input) on a DMD chip for 100% of its operating time even though there may be large periods of time when no energy is required as an output from the LIM.

Figure 1:
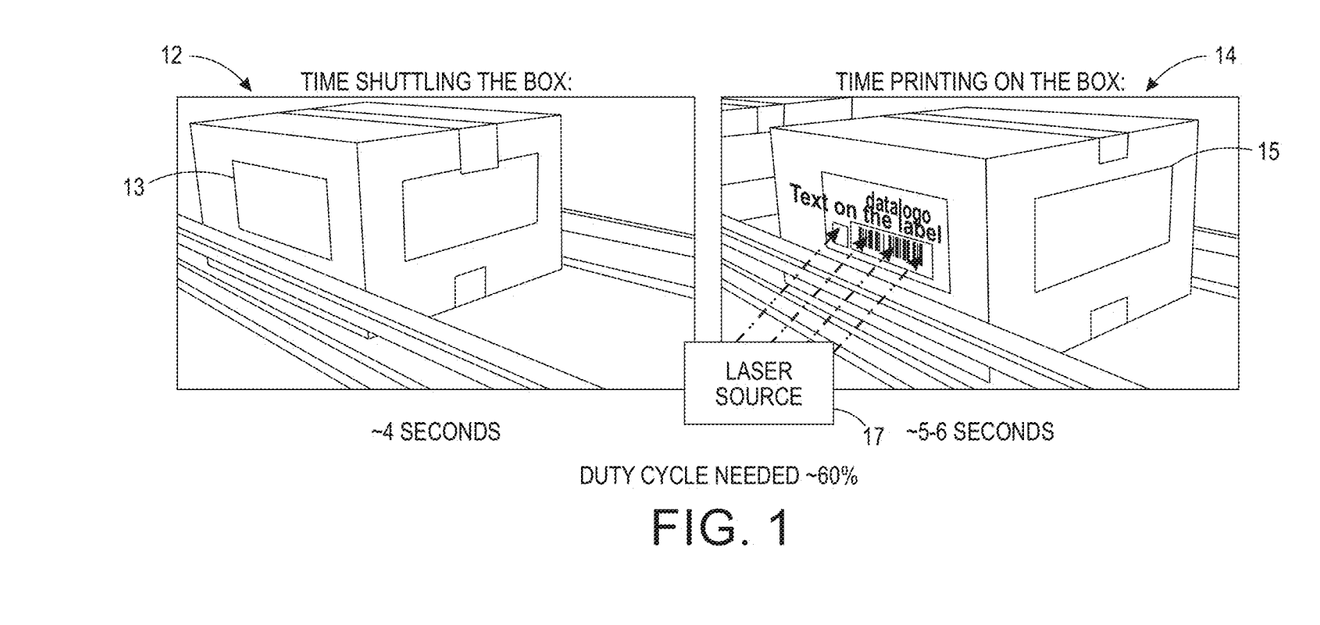
FIG. 1 illustrates an image of a box during time shuttling and an image of another box with time printing thereon, in accordance with example embodiments.

This scenario is very evident in FIG. 1, demonstrating an example usage of LIM technology with thermochromic inks. FIG. 1 illustrates an image 12 of a box 13 during time shuttling and an image 14 of another box 15 with time printing thereon and with a laser source indicated, in accordance with example embodiments. The example scenario shown in FIG. 1 demonstrates that there is a significant amount of time, when the printed substrate is moving in which no imaging needed. A video demonstration of this scenario can be found at: https://www.youtube.com/watch?v=HwADVZtxFp4.

The scenario shown in FIG. 1 and in the video at the aforementioned link amounts to ~5-6 seconds of Imaging "On-time" (e.g., see image 14) and ~4 seconds of Imaging "Off-time" (e.g., see image 12). Thus, in this case all that is needed is a ~60% duty-cycle from a LDA (Laser Diode Array) as input to the LIM for an adequate amount of time to image the object. Note that in FIG. 1, a laser source 17 is shown on the box 15. The digital image content transmitted from the laser source 17 may be composed of, for example, a barcode, and/or a QR (Quick Response) code, and so on, as shown in FIG. 1. The FIG. 1 scenario thus provides a basis for arriving at a 60% Laser-ON and 40% Laser-OFF duty-cycle as an example of how the disclosed concept is useful in practice.

Figure 2:
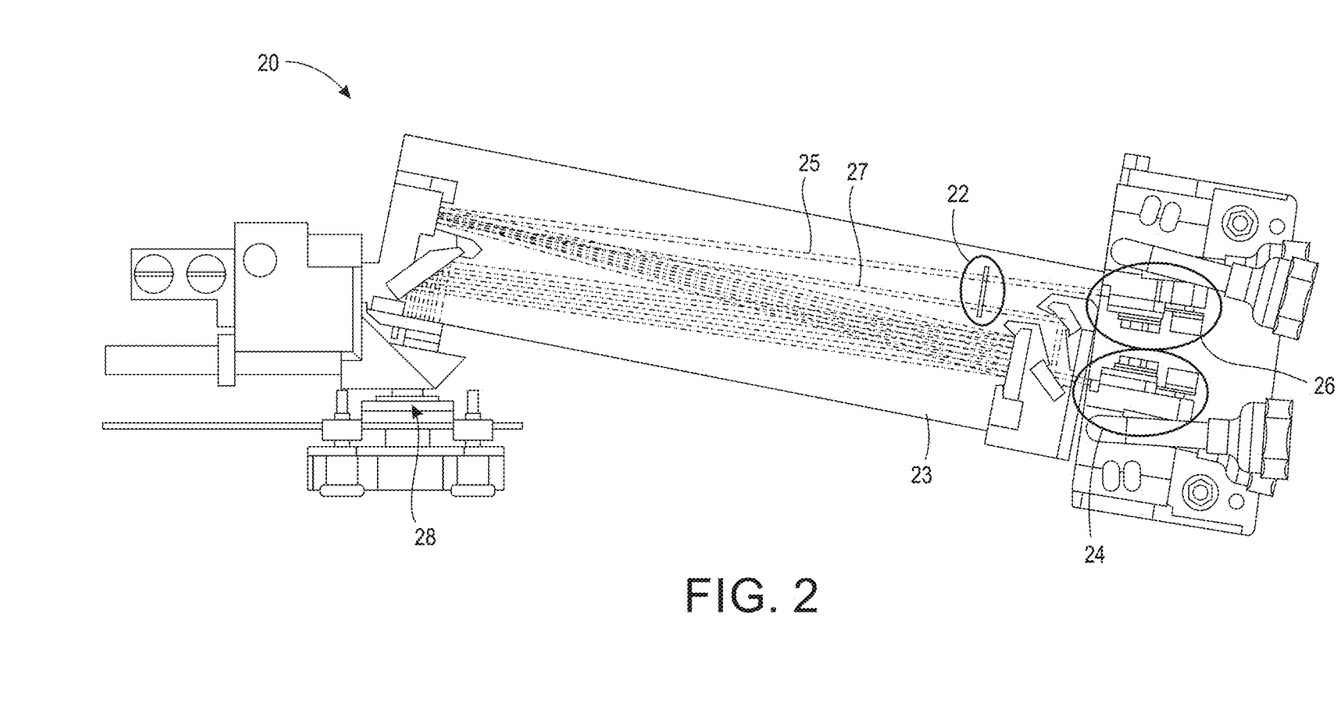
FIG. 2 illustrates a pictorial diagram of a laser imaging module, in accordance with an example embodiment.

FIG. 2 illustrates a pictorial diagram of a LIM 20, in accordance with an example embodiment. In the configuration of LIM 20, a shutter-like device 22 (also referred to as simply a "shutter") can be located upstream in the light path 25, 27 of a LDA (Laser Diode Array) 24 and/or 26 to divert energy out of the system and away from the DMD in periods of extended "non-imaging". A homogenizer assembly 23 can maintain the shutter-like device 22 shown in FIG. 2. It is more practical to take this approach rather than attempting to duty-cycle the laser power. Large current draw from the LDA's (Laser Diode Arrays) 24 and/or 26 themselves (several hundred Amps) render them somewhat impractical to turn-on/off frequently. The LDA's 24 and 26 form a dual LDA assembly.

The LIM 20 (laser imaging system) shown in FIG. 2 includes at least one (i.e., one or more) DMD 28 (but can include more than one DMD in some example embodiments), which is associated with the LDA's 24 and/or 26. The shutter-like device 22 is located in the light path of the LDA's 24 and/or 26 and diverts energy out of the system and away from the DMD 28 during periods of extended non-imaging. Note that the DMD 28 can be configured in some example embodiments with a substrate and a plurality of micro-mirrors. In some example embodiments, there may be thousands or millions of micro-mirrors in a rectangular or square micro-mirror array, further the micro-mirrors can be individually addressable, and each micro-mirror can tilt to a first position and a second position, and so on, responsive to control signals. Each micro-mirror can also possess a third untilted, or flat, position. A projection optics element such as a lens, for example, can be used to collect and output the reflected light. An exemplary DMD, for example, may be a Texas Instrument DMD micro-mirror array or other similar DMD component.

Figure 3A:
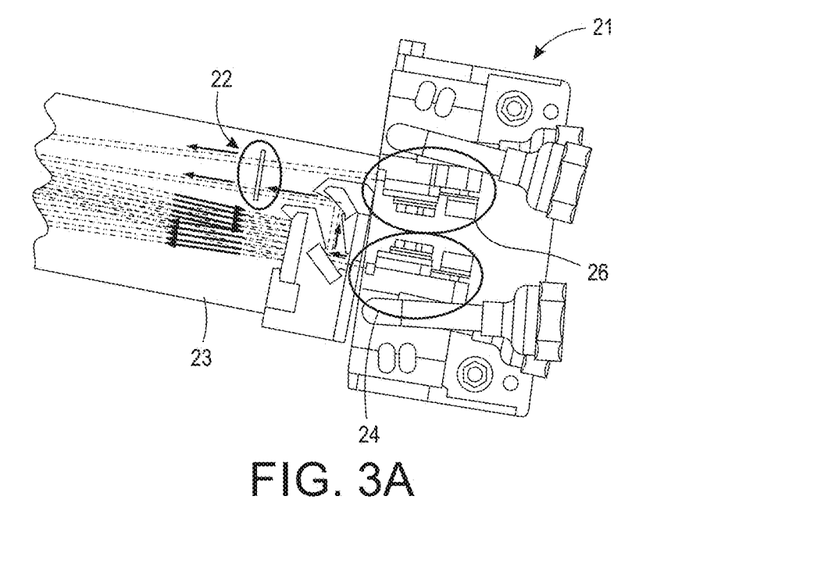
FIG. 3A illustrates a pictorial diagram depicting a close-up view of a laser imaging module, in accordance with an example embodiment.
Figure 3B:
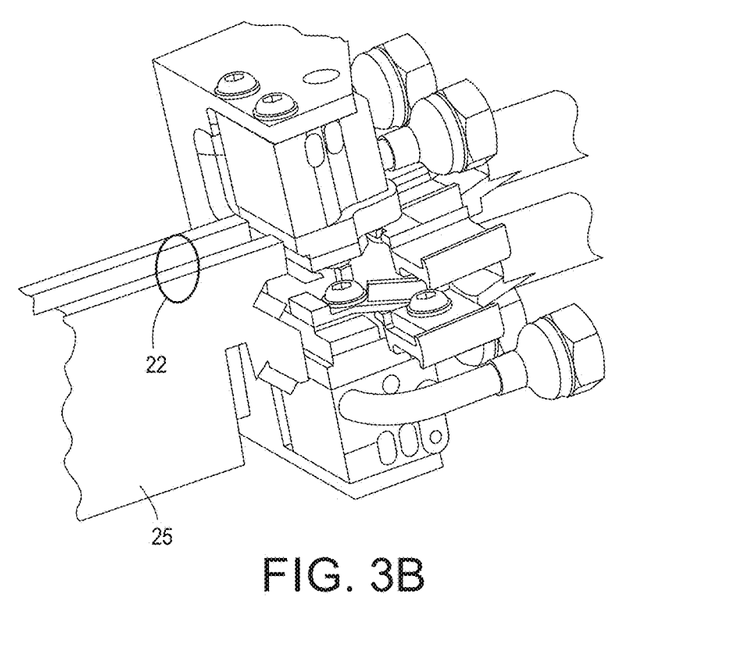
FIG. 3B illustrates a pictorial diagram depicting another close-up view of the laser imaging module, in accordance with an example embodiment.

FIG. 3A illustrates a pictorial diagram depicting a close-up view 21 of the LIM module 20 shown in FIG. 2, in accordance with an example embodiment. FIG. 3B illustrates a pictorial diagram depicting a side isometric close-up view of the LIM 20 of FIG. 2 including the dual LDA assembly and a portion of the homogenizer assembly or module 23, in accordance with an example embodiment. In FIGS. 3A-3B, placement of the shutter-like device 22 is shown as near as possible to the source of the laser energy. It is important that the shutter-like device 22 be located as shown in FIGS. 3A and 3B, so that the "shutter" 22 can be physically small, because the laser energy from the LDA's 24 and/or 26 is very concentrated at this point.

Figure 4:
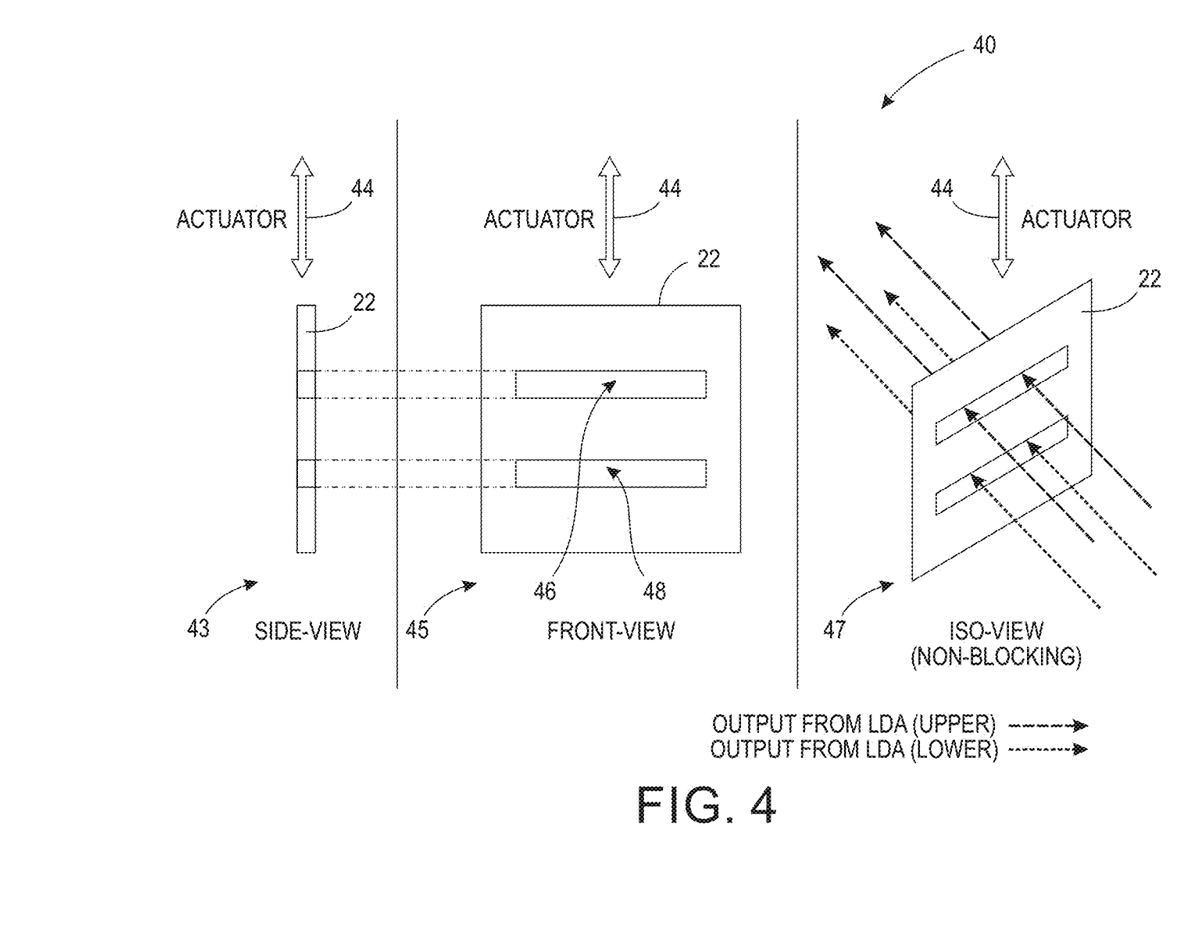
FIG. 4 illustrates a schematic diagram depicting a side-view, a front-view, and an isometric-view of a shutter-like device, in accordance with an example embodiment.

FIG. 4 illustrates a schematic diagram depicting a side-view 43, a front-view 45, and an isometric-view 47 of the shutter-like device 22, in accordance with an example embodiment. An actuator 44 is represented in views 43, 45, and 47 by an arrow with respect to the shutter-like device 22. FIG. 4 thus illustrates a schematic view of the shutter-like device from three different viewpoints. Laser energy from the two LDA's is represented by the black and grey dotted lines. The "shutter" device 22 can be actuated using any number of mechanical means, such as, but not limited to: a pneumatic cylinder, a piezo actuator, a motor driven, etc. The shutter-device 22 can be configured with openings 46, 48 as shown in the front view 45. Such openings 46, 48 may be provided in a variety of shapes (e.g., rectangular, square, etc.). The openings 46, 48 can be provided for line-source LDA's wherein opening 46 constitutes an LDA-upper opening and opening 48 comprises an LDA-lower opening.

Figure 5:
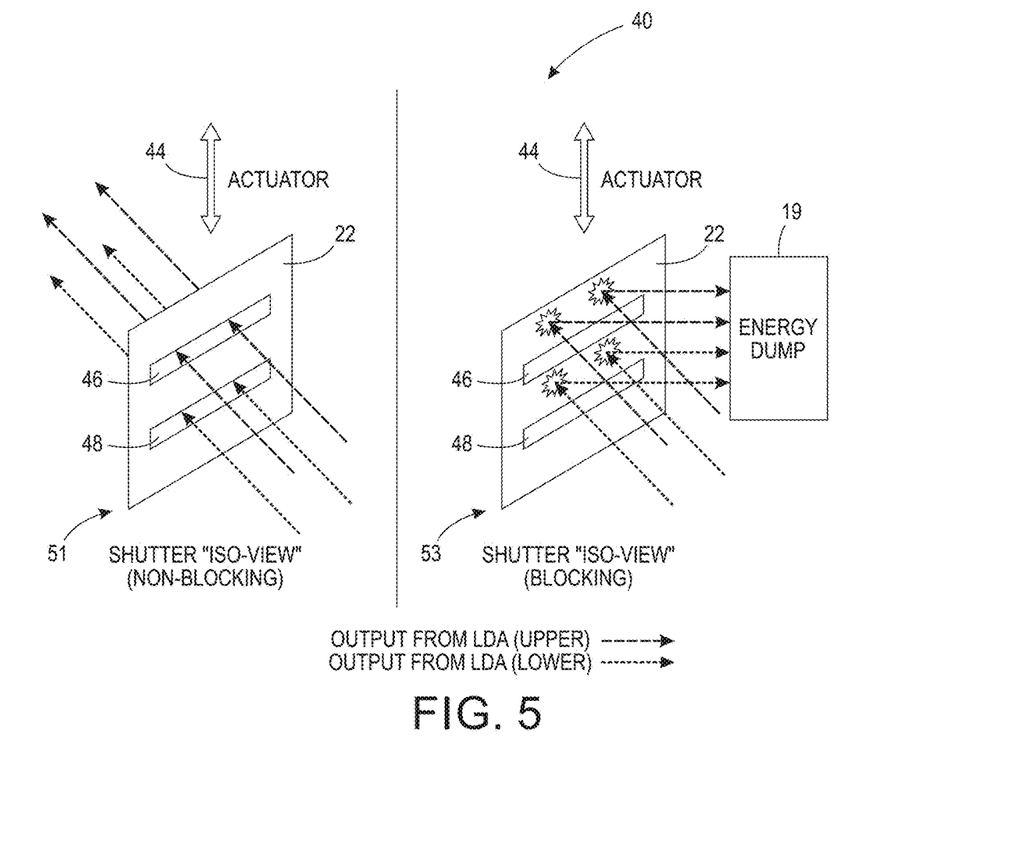
FIG. 5 illustrates a schematic diagram depicting a non-blocking isometric-view and a blocking isometric-view of a shutter-like device, in accordance with an example embodiment.

FIG. 5 illustrates a schematic diagram depicting a non-blocking isometric-view 51 and a blocking isometric-view 53 of the shutter-like device 22, in accordance with an example embodiment. FIG. 5 thus provides schematic view of the shutter 22 with blocking (non-image) and non-blocking (with image) positions. The schematic representations of the shutter-like device 22 depicted in FIG. 5 shows two possible states of operation. On the left-side view 51 of FIG. 5, there is shown image-content (at least one or more pixels used for a given duration of time) desired as output from the LDA, and therefore the shutter in the view 51 in the "non-blocking" position. Conversely, the right-side view 53 of FIG. 5 shows the case where there is no image-content for an extended duration of time, so the "shutter" 22 is moved into the "blocking" position. In the "blocking" position, the energy of the laser is absorbed into the shutter. Note that the right hand side configuration shown in FIG. 5 demonstrates an example of another means of the shutter 22 diverting energy away from the DMD's, rather than absorbing it, through the use of an energy dump 19. The right hand side configuration shown in FIG. 5 does not change the function of the shutter 22. Rather, it provides an alternative place for the waste energy to go if absorbing the energy into the shutter itself is not desired for practical reasons.

Note that the shutter-like device 22 can be made of virtually any material and specifically of a very thermally conductive material like copper so that the incident heat from the laser can be delivered to a heat-sink if necessary. Such a heat sink can be mounted to, for example, the backside of the "shutter" or many other convenient locations.

Figure 6:
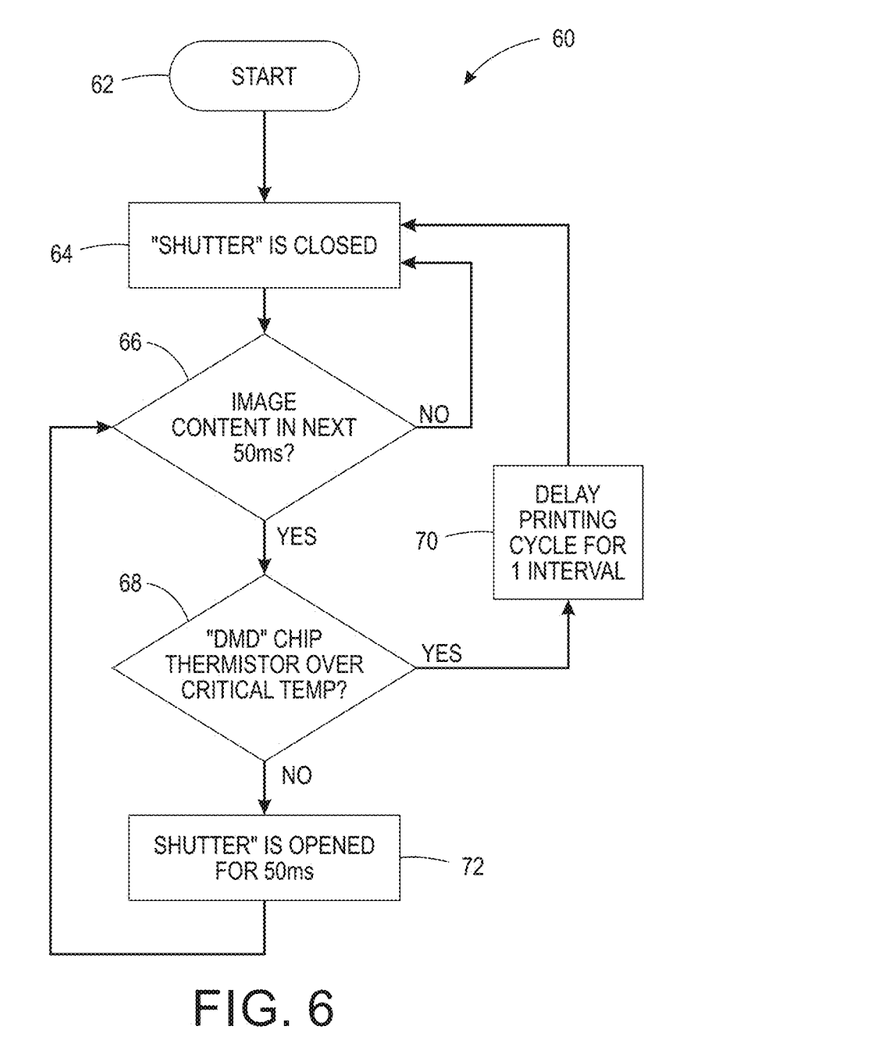
FIG. 6 illustrates a high-level flow chart of operations depicting logical operational steps of a method for implementing a feed-forward control loop, in accordance with an example embodiment.

FIG. 6 illustrates a high-level flow chart of operations depicting logical operational steps of a method 60 for implementing a feed-forward control loop, in accordance with an example embodiment. FIG. 6 thus illustrates a flow chart for a process/method 60 for limiting DMD chip temperature. Such an approach includes provisions for using feed-forward image content information and the current critical temperature of the DMD-chip, and using that information to determine the state of the shutter-like device 22.

As shown at block 62, the process begins with an assumption that the mechanical reaction time for the shutter-like device 22 is 50 ms. It can be appreciated that this time parameter of 50 ms is an example only and is not considered to be a limiting feature of the disclosed embodiments, but is discussed herein for illustrative and exemplary purposes only. As depicted thereafter at block 64, the shutter-like device 22 (i.e., the "shutter") is closed. Then, as illustrated at block 66, a test can be performed to determine if image content is required in, for example, the next 50 ms (i.e., for exemplary purposes only). If the answer is "no," then the operation depicted at block 64 and so on can be repeated. If the answer is "yes," then as indicated at block 68, a test can be performed to determine if the DMD chip thermistor is above a critical temperature. If the answer is "yes," then an operation can be implemented as indicated at block 70, to delay a printing cycle for one interval. If the answer is "no," then the operation depicted at block 72 is implemented, wherein the shutter-like device 22 is opened for 50 ms. Following the process of the operation illustrated at block 72, the operation described at block 66 is repeated and so on.

Note that in some embodiments, computer program code for carrying out operations of the disclosed embodiments may be written in an object oriented programming language (e.g., Java, C#, C++, Python, PHP, Ruby, Perl, Delphi, Objective-C, Swift, Common Lisp, and Smalltalk, etc.). Such computer program code, however, for carrying out operations of particular embodiments can also be written in conventional procedural programming languages, such as the "C" programming language or in a visually oriented programming environment, such as, for example, Visual Basic.

The program code may execute entirely on the user's computer, partly on the user's computer, as a stand-alone software package, partly on the user's computer and partly on a remote computer, or entirely on the remote computer. In the latter scenario, the remote computer may be connected to a user's computer through a local area network (LAN) or a wide area network (WAN), wireless data network e.g., Wi-Fi, Wimax, IEEE 802.xx, and cellular network, or the connection may be made to an external computer via most third party supported networks (e.g., through the Internet via an Internet Service Provider). The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 7:
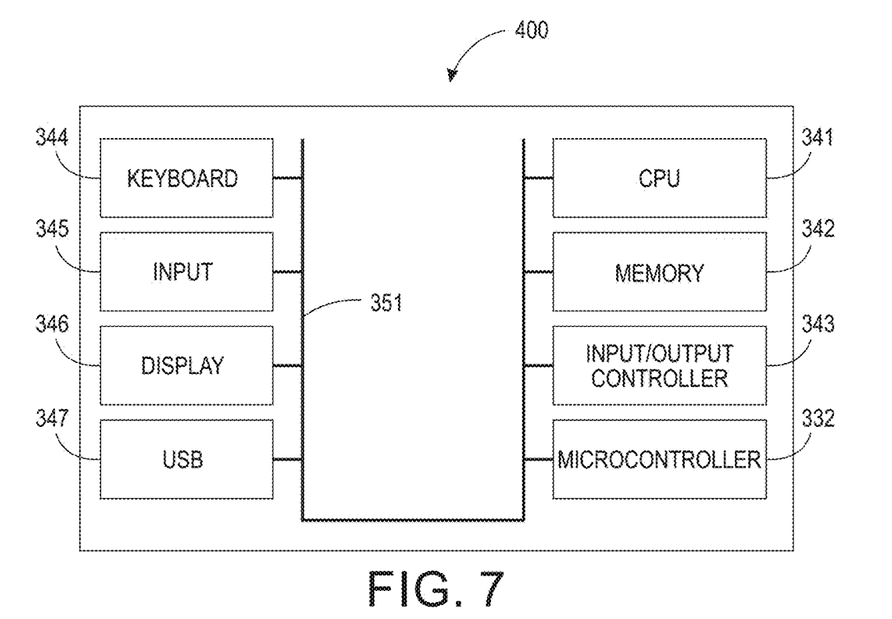
FIG. 7 illustrates a system for data-processing apparatus or system that can be utilized to implement instructions for operating an image-aware laser diode array shutter for redundant incident energy on a DMD chip set, in accordance with an example embodiment.
Figure 8:
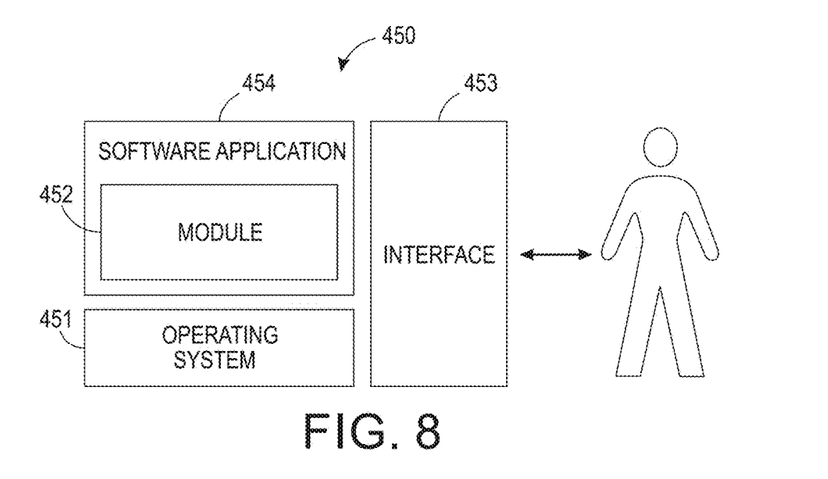
FIG. 8 illustrates a schematic view of a software system including a module, an operating system, and a user interface, in accordance with an example embodiment.

FIGS. 7-8 are provided as exemplary diagrams of data-processing environments in which embodiments may be implemented. It should be appreciated that FIGS. 7-8 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

FIG. 7 illustrates a system for data-processing apparatus or system 400 that can be utilized to implement instructions for operating an image-aware laser diode array shutter (e.g., such as the shutter-like device 22) for redundant incident energy on a DMD chip set, in accordance with an example embodiment. As depicted in FIG. 7, some embodiments may be implemented in the context of a data-processing system 400 that can include one or more processors such as a CPU (Central Processing Unit) 341, a memory 342, a controller 343 (e.g., an input/output controller), a peripheral USB (Universal Serial Bus) connection 347, a keyboard 344 (e.g., a physical keyboard or a touch screen graphically displayed keyboard), an input component 345 (e.g., a pointing device, such as a mouse, track ball, pen device, which may be utilized in association or with the keyboard 344, etc.), a display 346, and in some cases, a microcontroller 332, which may be implemented in the context of software and/or hardware. Such a microcontroller 332 may communicate electrically with, for example, the DMD and laser array devices and components discussed herein. Such communication may be implemented via wireless and/or wired communications means. In some example embodiments, the microcontroller 332 may provide control signals to the DMD 28 and the laser diode arrays 24, 26 and other components such as the shutter 22 described herein.

Data-processing system 400 may be, for example, a client computing device (e.g., a client PC, laptop, tablet computing device, etc.), which communicates with peripheral devices (not shown) via a client-server network (e.g., wireless and/or wired). In another embodiment, the data-processing system may be a server in the context of a client-server network or other server-based network implementation.

As illustrated, the various components of data-processing system 400 can communicate electronically through a system bus 351 or other similar architecture. The system bus 351 may be, for example, a subsystem that transfers data between, for example, computer components within data-processing system 400 or to and from other data-processing devices, components, computers, etc. Data-processing system 400 may be implemented as, for example, a server in a client-server based network (e.g., the Internet) or can be implemented in the context of a client and a server (i.e., where aspects are practiced on the client and the server). Data-processing system 400 may be, for example, a stand-alone desktop computer, a laptop computer, a Smartphone, a pad computing device, a server, and so on. In some example embodiments, the data-processing system 400 may implement all or a part of the device/system shown in FIG. 1.

FIG. 8 illustrates a computer software system 450 for directing the operation of the data-processing system 400 shown in FIG. 7. Software application 454, stored for example in memory 342, generally includes a kernel or operating system 451 and a shell or interface 453. One or more application programs, such as software application 454, may be "loaded" (i.e., transferred from, for example, memory 342 or another memory location) for execution by the data-processing system 400. The data-processing system 400 can receive user commands and data through the interface 453; these inputs may then be acted upon by the data-processing system 400 in accordance with instructions from operating system 451 and/or software application 454. The interface 453, in some embodiments, can serve to display results, whereupon a user may supply additional inputs or terminate a session.

The software application 454 can include one or more modules such as, for example, a module 452 (or a module composed of a group of modules), which can, for example, implement instructions or operations such as those described herein. Examples of instructions that can be implemented by module 452 include the various steps or operations described at blocks 62, 64, 66, 68, 70, 72 of method 60 in FIG. 6

The following discussion is intended to provide a brief, general description of suitable computing environments in which the system and method may be implemented. Although not required, the disclosed embodiments will be described in the general context of computer-executable instructions, such as program modules, being executed by a single computer. In some instances, a "module" constitutes a software application. However, a module may also be composed of, for example, electronic and/or computer hardware or such hardware in combination with software. In some cases, a "module" can also constitute a database and/or electronic hardware and software that interact with such a database. In some instances, a module may constitute an electronic and/or electro-mechanical hardware component such as a laser imaging module and other modules as discussed herein.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein can refer to a collection of routines and data structures that perform a particular task or implement a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application, such as a computer program designed to assist in the performance of a specific task, such as word processing, accounting, inventory management, etc. Thus, the various instructions or steps such as described herein can be implemented in the context of such a module or modules, sub-modules, and so on.

FIGS. 7-8 are thus intended as examples and not as architectural limitations of disclosed embodiments. Additionally, such embodiments are not limited to any particular application or computing or data processing environment. Instead, those skilled in the art will appreciate that the disclosed approach may be advantageously applied to a variety of systems and application software. Moreover, the disclosed embodiments can be embodied on a variety of different computing platforms, including, for example, Windows, Macintosh, UNIX, LINUX, and the like.

The disclosed embodiments thus include the use of a shutter to block the laser light from the Digital Micro-Mirror Device (DMD) chip to reduce the duty cycle of the laser exposure time. The duty cycle can be determined by the speed and size of the boxes and the label process direction width. The printing duty cycle could be as low as 40 to 50%, which would help reduce the steady state (SS) load. The shutter could be a low mass set of mirrors on a low mass actuator to deflect the beams to a fluid cooled heat sink sump outside the Laser Imaging Module (LIM) to reduce the interior heat load temperatures. Benefits of the disclosed embodiments include a total reduction of heat load at steady state (SS), which can reduce the total SS power needed to dissipate the heat.

Based on the foregoing, it can be appreciated that a number of different example embodiments are disclosed herein. For example, in one embodiment a laser imaging system can be implemented, which can include a digital micro-mirror device and one or more laser diode arrays associated with the digital micro-mirror device. A shutter-like device can be located upstream in a light path of the laser diode array (or arrays), wherein the shutter-like device diverts energy out of the system and away from the digital micro-mirror device during periods of extended non-imaging by the laser imaging system.

In some example embodiments, a homogenizer module can be provided, wherein the shutter-like device is located. A laser diode array assembly can also be configured, which maintains the laser diode array (or arrays). In another example embodiment, an actuator for actuating the shutter-like device can be provided. In some example embodiments, such an actuator may be a pneumatic cylinder device, a piezo actuator, or a motor driven actuator, etc.

In some example embodiments, the shutter-like device is operable in a non-blocking position in which image-content is desired as output from the laser diode array (or arrays). In some example embodiments, the shutter-like device is operable in a blocking position in which no image content is available during the periods of extending non-imaging. The blocking position energy from the laser diode array (or arrays) can be absorbed into the shutter-like device. In still other example embodiments, the shutter-like device can be configured from a thermally conductive material so that incident heat from the laser diode (or laser diodes) is deliverable to a heat sink.

In yet other example embodiments, the heat sink can be mounted to the shutter-like device. Additionally, the shutter-like device can include a body configured with one or more slots located upstream from the digital micro-mirror device, thereby selectively blocking any laser input energy and dissipating incident energy associated with the input laser energy, and wherein the digital micro-mirror device comprises a thermally sensitive DMD chip.

In another example embodiment, a laser imaging system can be implemented, which includes a digital micro-mirror device; a laser diode array assembly that maintains the laser diode array (or arrays), wherein the laser diode array (or arrays) is associated with the digital micro-mirror device; a shutter-like device located upstream in a light path of the laser diode array (or arrays), wherein the shutter-like device diverts energy out of the system and away from the digital micro-mirror device during periods of extended non-imaging by the laser imaging system; and a homogenizer module wherein the shutter-like device is located.

In another example embodiment, a laser imaging method can be implemented, which includes steps or operations such as locating a shutter-like device upstream in a light path of at least one laser diode array associated with a digital micro-mirror device; and diverting energy via the shutter-like device which diverts energy out of the system and away from the digital micro-mirror device during periods of extended non-imaging by the laser imaging system.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A laser imaging system for rendering of a digital image on a surface, comprising:
   a digital micro-mirror device;
   a dual laser diode array assembly comprising at least two laser diode arrays associated with said digital micro-mirror device wherein said dual laser diode array digitally and selectively heats ink to facilitate imaging including a delivery of a digital image on a surface pre-coated with said ink; and
   a shutter-like device located upstream in a light path of said at least two laser diode arrays of said dual laser diode array, wherein said shutter-like device diverts energy out of said system and away from said digital micro-mirror device during periods of extended non-imaging by said laser imaging system, wherein said shutter-like device comprises a body configured with at least one slot located upstream from said digital micro-mirror device, thereby selectively blocking any laser input energy and dissipating incident energy associated with said input laser energy, and wherein said digital micro-mirror device comprises a thermally sensitive DMD chip comprising a thermistor.

2. The system of claim 1 further comprising a homogenizer assembly comprising said shutter-like device.

3. The system of claim 2 wherein said digital image comprises at least one of: a barcode and a QR (Quick Response) code.

4. The system of claim 1 further comprising an actuator for actuating said shutter-like device.

5. The system of claim 4 wherein said actuator comprises at least one of the following: a pneumatic cylinder device and a piezo actuator.

6. The system of claim 1 wherein said shutter-like device is operable in a non-blocking position in which image-content is desired as output from said dual laser diode array for said imaging.

7. The system of claim 1 wherein said shutter-like device is operable in a blocking position in which no image content is available during said periods of extending said non-imaging.

8. The system of claim 1 wherein said blocking position energy from said at least two laser diode arrays is absorbed into said shutter-like device.

9. The system of claim 1 wherein said shutter-like device is configured from a thermally conductive material so that incident heat from said at least one laser diode is deliverable to a heat sink.

10. The system of claim 9 wherein said heat sink is mounted to said shutter-like device.

11. The system of claim 2 wherein if said thermistor of said thermally sensitive DMD chip is above a critical temperature, said imaging is automatically delayed for at least one interval.

12. A laser imaging system for rendering of a digital image on a surface, comprising:
    a digital micro-mirror device;
    a dual laser diode array assembly comprising at least two laser diode arrays, wherein said dual laser diode array assembly is associated with said digital micro-mirror device wherein said dual laser diode array digitally and selectively heats ink to facilitate imaging including a delivery of a digital image on a surface pre-coated with said ink;

a shutter-like device located near a source of laser energy for said at least two laser diode arrays and upstream in a light path of said dual laser diode array, wherein said shutter-like device diverts energy out of said system and away from said digital micro-mirror device during periods of extended non-imaging by said laser imaging system; and a homogenizer assembly comprising said shutter-like device, wherein said shutter-like device comprises a body configured with at least one slot located upstream from said digital micro-mirror device, thereby selectively blocking any laser input energy and dissipating incident energy associated with said input laser energy, and wherein said digital micro-mirror device comprises a thermally sensitive DMD chip comprising a thermistor.

13. The system of claim 12 further comprising an actuator for actuating said shutter-like device, wherein said actuator comprises at least one of the following: a pneumatic cylinder device and a piezo actuator.

14. The system of claim 12 wherein:
said shutter-like device is operable in a non-blocking position in which image-content is desired as output from said dual laser diode array assembly;
said shutter-like device is operable in a blocking position in which no image content is available during said periods of extending said non-imaging; and
in said blocking position, energy from said dual laser diode array assembly is absorbed into said shutter-like device.

15. The system of claim 14 wherein said shutter-like device is configured from a thermally conductive material so that incident heat from said at least one laser diode is deliverable to a heat-sink and wherein said heat-sink is mounted to said shutter-like device.

16. The system of claim 15 wherein if said thermistor of said thermally sensitive DMD chip is above a critical temperature, said imaging is automatically delayed for at least one interval.

17. A laser imaging method for rendering of a digital image on a surface, comprising:

locating a shutter-like device upstream in a light path of a dual laser diode array assembly comprising at least two laser diode arrays associated with a digital micro-mirror device;

digitally and selectively heating ink with said dual laser diode array to facilitate imaging including a delivery of a digital image on a surface pre-coated with said ink; and diverting energy via said shutter-like device diverts energy out of said system and away from said digital micro-mirror device during periods of extended non-imaging by said laser imaging system, wherein said shutter-like device comprises a body configured with at least one slot located upstream from said digital micro-mirror device, thereby selectively blocking any laser input energy and dissipating incident energy associated with said input laser energy, and wherein said digital micro-mirror device comprises a thermally sensitive DMD chip comprising a thermistor; and wherein if said thermistor of said thermally sensitive DMD chip is above a critical temperature said imaging is automatically delayed for at least one interval.

18. The method of claim 17 further comprising actuating said shutter-like device via an actuator comprising at least one of the following: a pneumatic cylinder device and a piezo actuator.

19. The method of claim 17 wherein:
said shutter-like device is operable in a non-blocking position in which image-content is desired as output from said at least one laser diode array;
said shutter-like device is operable in a blocking position in which no image content is available during said periods of extending said non-imaging;
and said blocking position energy from said at least one laser diode array is absorbed into said shutter-like device.

20. The method of claim 18 wherein said shutter-like device is configured from a thermally conductive material so that incident heat from said at least one laser diode is deliverable to a heat-sink and wherein said heat-sink is mounted to said shutter-like device.

* * * * *